United States Patent
Heimbach et al.

[15] 3,656,622
[45] Apr. 18, 1972

[54] FILTER PLATE ELEMENT

[72] Inventors: Franz Heimbach; Alfons Schotten, both of Dueren, Germany

[73] Assignee: Eberhard Hoesch & Sohne, Duren, Germany

[22] Filed: July 6, 1970

[21] Appl. No.: 52,193

[30] Foreign Application Priority Data

Dec. 4, 1969  Germany..................P 19 60 821.0

[52] U.S. Cl............................................................210/231
[51] Int. Cl..................................................B01d 25/12
[58] Field of Search.......................................210/224–231; 100/198

[56] References Cited

UNITED STATES PATENTS

FOREIGN PATENTS OR APPLICATIONS 708,441  4/1965  Canada...................................210/228

Primary Examiner—Reuben Friedman
Assistant Examiner—T. A. Granger
Attorney—Michael S. Striker

[57] ABSTRACT

A filter plate element for use in filter presses has a peripheral frame surrounding an inner free space and having an inwardly directed surface which bounds this space and a pair of axial endfaces. A press diaphragm includes a main portion accommodated in the free space intermediate the endfaces and a circumferential edge portion which bounds the main portion and which overlies a circumferential portion of the surface, extends to one of the endfaces where it is secured by means of a marginal circumferential bead received in a groove provided in this one endface.

15 Claims, 5 Drawing Figures

3,342,123  9/1967  Ermakov et al...................210/225 X

INVENTORS:
FRANZ HEIMBACH
ALFONS SCHOTTEN
BY Michael S. Striker
Attorney

INVENTORS:
FRANZ HEIMBACH
BY ALFONS SCHOTTEN
Michael S. Striker
Attorney

FILTER PLATE ELEMENT

BACKGROUND OF THE INVENTION

The present invention relates to filter elements in general, and more particularly to a filter plate element. Still more specifically, the present invention relates to a novel filter plate element for use in filter presses. Filter presses utilize filter plate elements, usually a stack of them, and usually so arranged that each filter plate element is located horizontally or at least substantially horizontally. Such filter plate elements have a filtrate chamber and a chamber for the liquid to be filtered, and conventionally utilize a press diaphram or membrane the surface area of which corresponds substantially to the surface area of the chamber for the liquid to be filtered. When pressure is exerted in the filter press, for instance by means of a pressure fluid admitted in requisite manner, then the press diaphragm is deflected to the chamber containing the liquid to be filtered, pressing such liquid through the filter cloth of the filter plate element so that the solid residue remains behind the chamber forming a filter cake therein. The press diaphragm expresses liquid from this filter cake to make the same drier or at least substantially dry. The problem with these known constructions is the fact that the press diaphragm does not exert pressure upon the filter cake at its periphery, because the periphery of the press diaphragm is secured to the frame of the filter plate element. The filter cake adheres to the frame which bounds the chamber for the liquid to be filtered in which the filter cake develops, and not only does this arrangement result in inadequate expressing of liquid from the filter cake, but also the latter is difficult to release from the frame to which it adheres after the filter press is opened and the individual filter plate elements are separated.

Evidently, this is undesirable and attempts have therefore been made to improve the situation. Thus, it is known — in constructions where the filter plate elements are requisitely mounted — to provide at least a portion of the surface bounding the chamber in which the filter cake develops, in such a manner that it is outwardly beveled to thereby impart to the filter cake the tendency to slide over this portion and to release more readily, and in any case, not to adhere to it. However, it has been found that this approach is not reliable enough and particularly in the type of filter presses where the filter plate elements are arranged horizontally in a stack — under which the invention is primarily although not exclusively directed — it cannot be used because when the filter press is opened and the filter plate elements are vertically separated from one another, the filter cake must fall downwardly out of the downwardly directed chamber accomodating the liquid to be expressed and subsequently accomodating the residual filter cake, so that the sliding effect of the filter cake sliding over the inclined portion of the surface bounding the chamber — which is obtained where the filter plate elements are arranged vertically or at least substantially vertically — is not obtained in such an arrangement.

SUMMARY OF THE INVENTION

It is, accordingly, an object of the present invention to overcome this disadvantage.

More particularly, it is an object of the present invention to provide a novel filter plate element which is not possessed of this disadvantage.

Still more particularly, it is an object of the present invention to provide a novel filter plate element in which the filter cake is not only adequately expressed of its liquid content, but also will readily release from the interior of the chamber in which it is formed.

In pursuance of the above objects, and others which will become apparent hereafter, one feature of the invention resides, briefly stated, in a filter plate element which comprises peripheral frame means surrounding an inner free space and having an inwardly directed surface bounding this space and a pair of axial endfaces. A press diaphragm is provided and includes a main portion accommodated in the free space intermediate the endfaces and a circumferential edge portion which bounds the main portion and overlies at least a circumferential portion of the aforementioned surface, extending to one of the endfaces where it is secured to the frame means.

In this construction, the press diaphragm is no longer secured at the peripheral inwardly directed surface bounding the free space, for instance by clamping, but instead is secured at one of the axial endfaces. In this construction, introduction of a pressure medium between the endface and the press diaphragm, that is in a manner requisite to exert pressure with the press diaphragm upon the filter cake forming in the chamber accommodating the liquid to be filtered, the press diaphragm would move towards the filter cake not only in the region of the free space, but also over the entire inwardly directed surface bounding this free space. Thus, the filter cake will be completely expressed, including its marginal portions, and at the same time it will loosen from the inwardly directed surface of the peripheral frame means, as well as from the press diaphragm. When, subsequently, the press diaphragm retracts as a result of withdrawal of the pressure medium, then it will become separated completely from filter cake, including in the marginal regions of the latter, and the filter cake will simply adhere to the filter cloth. If now the filter press utilizing one or more of these filter plate elements is opened, then all that remains to be done is to separate the filter cake from the filter cloth. If the filter plates are vertically or substantially vertically arranged, then this is accomplished in a simple manner several of which are well known in the art, for instance by outwardly bending or otherwise deflecting the cloth, by stretching the filter cloth in its plane, by scrapers or the like. On the other hand, if the filter plate elements are arranged horizontally or substantially horizontally, and the filter cloth is endless and passed in a zig-zag path between reversing rollers, then movement of the filter cloth through the reversing rollers causes the filter cake to be scraped off by the reversing rollers.

In addition, the present invention assures that the pressure medium can now be applied in a most simple manner to the reverse or pressure side of the pressed diaphragm through suitable channel means provided in the peripheral frame. This means that the channel means can be short and straight, and that it can be readily reached for inspection, maintenance and the like.

Another advantage of the present invention is the fact that the portion of the press diaphragm which extends to one of the endfaces and is secured at the latter, can itself serve as a seal which abuts against and provides a seal with an axially adjacent similar filter plate element, particularly if this portion is configurated as a bead or provided with such a bead. It is advantageous if the one endface where this portion is located is provided with a circumferentially extending groove which is preferably undercut, for instance in dovetail-shaped cross section, and if the bead or portion of the press diaphragm is of similarly selected cross section and received in this groove. To assure a rapid as well as an even supply of pressure medium over the entire reverse side of the pressure diaphragm, especially to provide for a rapid withdrawal of the pressure medium, it is further advantageous to provide channels at that side of the press diaphragm which faces away from the chamber in which the liquid to be filtered is accommodated.

Furthermore, to facilitate the supply of liquid to be accommodated, the circumferential margin of the press diaphragm may be provided with one or several tubular sections extending in substantial parallelism with the main portion of the press diaphragm and through which the liquid to be supplied may pass. The outer cross-sectional configuration of these tubular sections corresponds to that of the channel or channels provided in the frame for the supply of the liquid, and these tubular sections are then simply inserted in the channel or channels. No connection means is needed to connect the tubular sections with the frame means because the pressure at which the liquid to be filtered is supplied, presses the yieldable diaphragm tubular sections outwardly against the inner surfaces bounding the supply channels in the peripheral frame and thus provides for reliable retention and sealing so that the liquid to be filtered cannot escape into the space between the press diaphragm and the filter plate. Mounting of a press diaphragm provided with such tubular section or sections is very simple, and further the accumulation of contaminants in the supply channels in the peripheral frame is avoided by the provision of these tubular sections. Of course, the tubular sections must be stiff enough so that during supply of pressure medium, they are not flattened, permitting the pressure medium to escape between their outer surfaces and the inner surfaces of the channel in the peripheral frame. However, it is understood that a small amount of leakage is acceptable and can even serve the purpose of cleaning out the channel. A further advantage of this arrangement is that as the pressure medium is supplied, the press diaphragm is compressed in the region when its circumferential edge portion merges with the inner open end of the respective tubular section, so that the escape of portions of the filter cake for these tubular sections is thereby prevented.

It is advantageous, although not entirely necessary, to provide reinforcements such as metallic or other embedments in the walls bounding the tubular sections to resist compression during the actual pressing operation, or a suitable insert can be introduced into the respective tubular section having adequate resistance to deformation.

At the free end of the tubular sections, that is the ends which are located at the outer edges of the peripheral frame, they may be provided with a flange and if a reinforcing or supporting element is introduced into the tubular sections, a similar flange overlying the aforementioned flange of the tubular sections, may be provided on the supporting element. This provides for a reliable seal with respect to the channel in which the tubular section and associated supporting element are accommodated. The installation of such a construction is very simple because the supporting element can be inserted into the respective tubular section and then pushed from inside through the channel to the outside of the frame if this is possible because of the dimensioning, or else the tubular section can be inserted from the inside and the supporting element consequently from the outside. The tubular sections and/or the reinforcing or supporting elements if such are inserted into them, can be provided with one or more passages for the liquid to be filtered.

As already pointed out, the portion of the press diaphragm which overlies in part one of the endfaces of the peripheral frame, can serve as a seal with respect to an adjacent filter plate element. However, it is advantageous and generally advisable to provide an additional seal located outwardly of the groove in which the aforementioned portion of the press diaphragm is received, and also extending circumferentially of the peripheral frame, that is the aforementioned endface thereof. The groove and the additional seal are spaced from one another and in this space one or more bores may be provided in the peripheral frame extending between the axial endfaces of the latter so that any liquid which should escape past the groove and the portion of the press diaphragm accommodated in this groove, can leave through such bores. In fact, the space between the groove and the outer seal can be provided with a channel communicating with the bore or bores; however, the channel can also be provided at the other endface. If the bores are so provided that they are aligned in all filter plate elements of a stack used in a filter press, this is especially advantageous. The amount of liquid which manages to leak and escape through the bores can provide a certain indication whether there is a substantial leak anywhere in one of the filter plate elements so that corrective action can be taken. Of course, if for this purpose any individual filter plate elements are to be observed, then an additional bore can be provided extending to the outer edge of the respective peripheral frame so that by observing the amount of leakage liquid passing out through such additional bore, can be observed which if any of the specific filter plate elements are leaking. In fact, the purpose of this double seal is highly advantageous even in constructions where the filter plate element does not use a press diaphragm. In other words, the advantages obtained with respect to double sealing, as well as control of possible leakage and determination where such leakage occurs, are such that it is advantageous to simply provide a double seal corresponding to the outer seal and to the portion of the press diaphragm received in the aforementioned groove in one of the endfaces of the peripheral frame, even if the filter plate element per se does not need a press diaphragm. Of course, in such case, the groove would accommodate simply a portion of suitable configuration which would act as a seal, whereas the remainder of the aforedescribed diaphragm would be omitted. This construction can, of course, be used regardless of how the filter plate elements are arranged, that is vertically or horizontally. If the filter plate elements are arranged horizontally — regardless of whether the press diaphragm is present in its totality or only a portion acting as a seal is present — it is advantageous to lead away any leakage liquid in the aforementioned channel provided in one of the axial endfaces of the respective frame, preferably at the upper axial endface of the frame where the filtrate chamber or chamber for filtered liquid is located.

On the other hand, if certain circumstances require, for instance if liquids are filtered which are chemically especially aggressive or lead to the development of noxious or poisonous vapors, escape to the outside can be prevented by providing the aforementioned leakage-liquid escape passages with connections for which a pressure means can be introduced so that certain amount of over pressure exists in the passage channels or the like to prevent the escape of leakage liquid and of course the pressure means must be of such character that if the seal should become defective and pressure medium should enter into the space accommodating the liquid to be filtered, such entry would not have disadvantageous effects on this liquid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
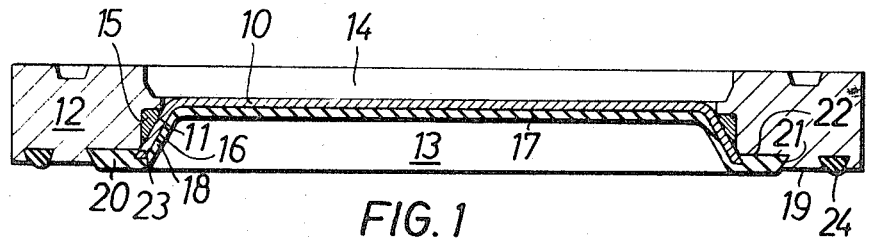
FIG. 1 is a somewhat diagrammatic cross section of a filter plate element, according to the present invention.

Discussing now the drawing in detail, and firstly FIGS. 1–4, it will be seen that the illustrated filter plate element here comprises a plate wall 10 with a tapered edge 11. The wall 10 may, for instance, consist of sheet steel, and is mounted in a peripheral frame 12 which extends to both axial sides of the wall 10 and together with this wall defines at the downward side, a space 13 to be filtered and at the upward side a filtrate space, that is a space 14 for filtered liquid. The space between the edge 11, the plate wall 10 and the frame 12 is filled by a reinforcing frame 15 which is inserted and held in place by welding or the like. The frame 12 and the supporting frame 15 are so rigid that they will withstand all forces which will occur in the actual pressing operation. The wall 10 is securely connected by welding with the supporting frame 15. The elements just mentioned are of importance for the purposes of the present invention only insofar as the edge 11 of the wall 10 is outwardly tapered, as is indicated at the inner surface 16.

FIG. 1 shows the novel filter plate element in pressureless condition, that is in a condition which will prevail when it is not subjected to filtration pressure. It is provided with a press diaphragm 17 which in this condition abuts its main portion against the filter plate wall 10 and overlies the surface 16 of the edge 11. A circumferential edge portion 20 extends from said main portion to and beyond the axial endface 19 of the frame 12. In the illustrated embodiment, the portion 20 is of dovetail-shaped cross section and received in a complementary configurated circumferentially extending groove which in the illustrated embodiment is formed by the surfaces 21 and 22 of the frame 12, as well as the reverse surface 23 at the edge 11. The portion 20 serves as a seal and outwardly spaced therefrom an additional conventional circumferentially extending seal 24 is provided at the same endface 19 of the frame 12.

Figure 2:
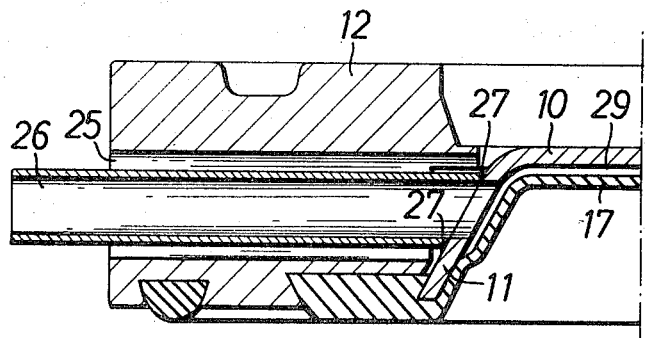
FIG. 2 is an enlarged fragmentary section through a portion of the embodiment of FIG. 1.

A bore 25 is provided in the frame 12, as shown in FIG. 2, and a bore 26 is provided in the bore 25 for the supply of pressure fluid. This is fluid-tightly connected with the edge 11 of the wall 10 at 27. With respect to the wall 10 and the edge 11, the press diaphragm 17 is spaced by supporting ribs 28 provided on the reverse side of the diaphragm as clearly shown in FIG. 3; this provides fluid channel 29 and FIG. 2 shows that in this manner, the pressure fluid can readily and quickly reach the entire reverse side of the diaphragm 17 in this manner.

Figure 3:
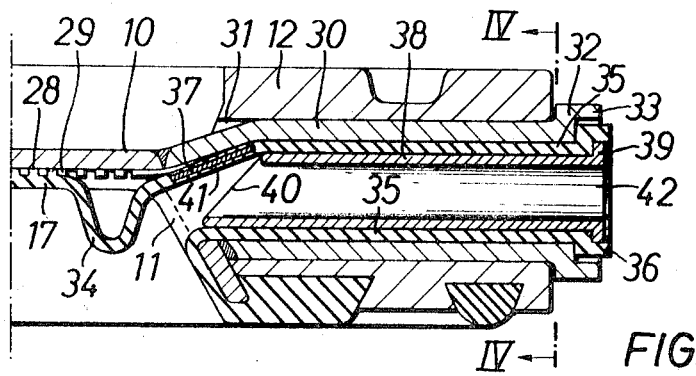
FIG. 3 is a similar enlarged fragmentary section through another portion of the embodiment of FIG. 1.
Figure 4:
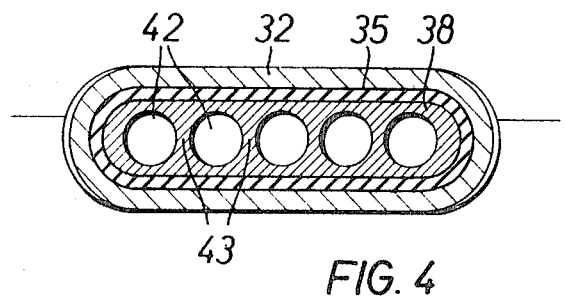
FIG. 4 is a section taken on line IV—IV of FIG. 3.

The configuration of the diaphragm 17 at the supply of liquid to be filtered is shown more clearly in FIGS. 3 and 4. Here the wall 10 and its edge 11 are connected as by welding with a nipple 30 which passes through a bore 31 in the frame 12 and which abuts with a flange 32 against the outer edge of the frame. The flange 32 has a sleeve portion 33 as shown in FIG. 3. The diaphragm 17 is formed at the region where liquid to be filtered enters the filtration chamber with a fold 34 having half the height of the edge 11 and provided with a tubular section 35 the outer configuration of which corresponds to the inner cross sectional configuration of the nipple 30. This section 35 is also provided with a correspondingly formed sleeve portion 36. A reinforcement 37 — here a sheet metal insert — is accommodated in the section in its upper closure region and the section 35 itself is reinforced by a reinforcing element 38 which is provided at its outer end — that is outwardly with respect to the peripheral frame 12 — with a flange 39. At 40, that is at its inner end, the supporting element 38 is provided with an inclined end face. When pressure fluid is admitted between wall 10 and diaphragm 17, the correspondingly front portion 41 of the inner end of section 35, reinforced by the sheet metal reinforcement 37, seal-tightly overlies the inclined endface 40 in the manner of a flap-valve, and prevents a pressing-out of the filter cake from the chamber 13.

As shown in FIG. 4, the supporting element 38 is provided with several bores 42 extending lengthwise of the tubular section 35. On the one hand, this provides an adequate cross-sectional area for such of the liquid to be filtered with a correspondingly low flow resistance. On the other hand, the portions 43, remaining between the bores 42, are sufficiently strong to prevent a collapse of the supporting element 38 when the actual pressing operation takes place. Also, the frame 12 is reinforced in this area by the presence of the supporting element 38 against the closing pressure of a filter press utilizing the novel filter plate element.

Figure 5:
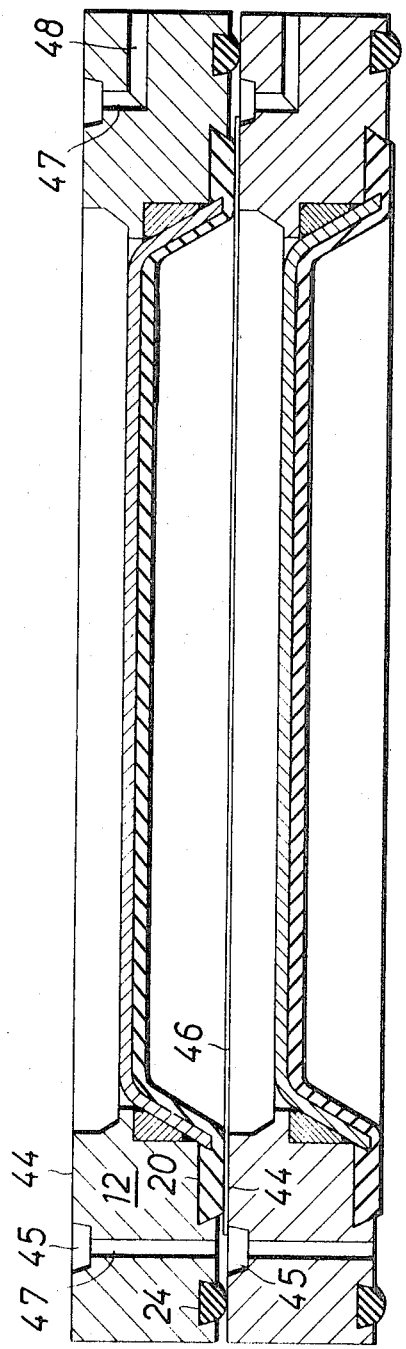
FIG. 5 is a view similar to FIG. 1 on a slightly larger scale, illustrating a further embodiment.

Coming, finally, to the embodiment illustrated in FIG. 5, it will be seen that here the upper axial endface 44 of the frame 12, that is the one at which the filtrate chamber 14 is located, is provided with a circumferentially extending channel 45 which, while it has also been illustrated for the sake of clarity in the preceding Figures, need not be present in the other Figures. In FIG. 5, this channel 45 serves to receive leakage liquid which may have leadked between leaked portion 20 of one filter plate element and the cooperating surface 44 of the adjacent filter plate element, or through the filter cloth 46 and which is prevented from outward movement by the outer seal 24. The drawing shows that the filter cloth 46 extends only to a channel 45 so that the outer seal 24 will reliably seal against the escape of leakage liquid while it is possible that the portion 20 of the diaphragm 17 will not seal absolutely tightly if the filter cloth 46 permits filtrate to escape in its own plane, that is, laterally in FIG. 5. Such a so-called "transfer filtration" with corresponding loss of leakage liquid, is frequently unavoidable so that the arrangement of the double seal provided according to the present invention and the withdrawal of leakage liquid between the two seals, is of particular importance. The leakage liquid leaves the channel 45 through a bore 47 from where it moves into the channel 45 of the next lower filter plate element, and it is advantageous that the bores 47 of all filter plate elements are arranged in a stack in the filter press and be aligned with one another to provide for a reliable escape of leakage liquid. The right-hand side of FIG. 5 shows that the bores 47 are only rather short and that they may be — although they need not be — supplemented with a transverse bore 48 which communicates with them and leads outwardly of the frame 12 to permit escape of the leakage liquid to the outside. Of course, each of the frames 12 may be provided with such a bore 48 to permit a determination if a particular one of the portions 20 leaks.

It will be understood that each of the elements described above, or two or more together, may also find a useful application in other types of constructions differing from the types described above.

While the invention has been illustrated and described as embodied in a filter plate element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be protected by Letters Patent is:

1. In a filter plate element for use in a filter press, in combination, frame means surrounding an inner free space having an open side and adapted to accommodate a filter cake which accumulates during use of said element, said frame means having opposite axial end faces and an inner surface bounding said free space intermediate said axial end faces, and being provided with inlet and outlet means for the passage of fluid; and means for loosening the filter cake for expulsion from said inner free space through said open side, said means comprising a press diaphragm including a main portion accommodated in said free space intermediate said end faces overlying said surface and a circumferential edge portion extending from said main portion to one of said end faces, and distending means for distending said pressure diaphragm in direction towards said open side.

2. In a filter plate element as defined in claim 1, said endface being provided with a circumferentially extending undercut groove, and said edge portion having a complementary peripheral marginal portion received in said groove.

3. In a filter plate element as defined in claim 1, said press diaphragm having a side facing towards said one endface and an other side facing towards the other of said endfaces; and further comprising liquid-conducting channel means located at said other side of said press diaphragm.

4. In a filter plate element as defined in claim 1, said press diaphragm having a peripherally extending marginal portion including at least one tubular section extending in at least substantial parallelism with said main portion, and said frame means having at least one supply channel extending therethrough to said inner space, said supply channel and tubular section being of complementary cross-section and said tubular section being received in said supply channel.

5. In a filter plate element as defined in claim 4, said tubular section having an inner end region proximal to said edge portion and an outer end region remote from said edge portion; and further comprising a supporting element of deflection-resistance material received in said section and extending from said outer end region towards said inner end region but sufficiently short thereof so that said inner end region has freedom of deflection in a sense closing said tubular section in response to exertion of axial pressure on said filter plate element.

6. In a filter plate element as defined in claim 4, said tubular section having an inner end region deflectable in a sense closing said tubular section in response to exertion of axial pressure upon said filter plate element; and further comprising reinforcing means provided in the area of said inner end region.

7. In a filter plate element as defined in claim 6, wherein said reinforcing means comprises reinforcing ribs.

8. In a filter plate element as defined in claim 6, wherein said reinforcing means comprises metallic embodiments.

9. In a filter plate element as defined in claim 4; further comprising a supporting element accommodated in said tubular section and provided with a plurality of passages extending lengthwise of said tubular section.

10. In a filter plate element as defined in claim 9, said passages being bores.

11. In a filter plate element as defined in claim 5, said section and said supporting element having complementary abutting flanges.

12. In a filter plate element as defined in claim 2, said groove and said marginal portion being of dovetail-shaped cross-section.

13. In a filter plate element as defined in claim 2; further comprising a peripherally extending sealing element provided on said endface outwardly spaced from said groove for sealing abutment with a similar endface of another filter plate element; and at least one bore extending between said endfaces intermediate said sealing element and said groove.

14. In a filter plate element as defined in claim 13, one of said endfaces further having a circumferentially extending channel communicating with said one bore.

15. In a filter plate element as defined in claim 14; and at least one additional bore extending from said channel to an outer edge face of said frame means.

* * * * *